Nov. 17, 1931. W. H. LEVERETT ET AL 1,832,490
PROCESS OF PRODUCING SULPHURIC ACID
Filed July 22, 1927
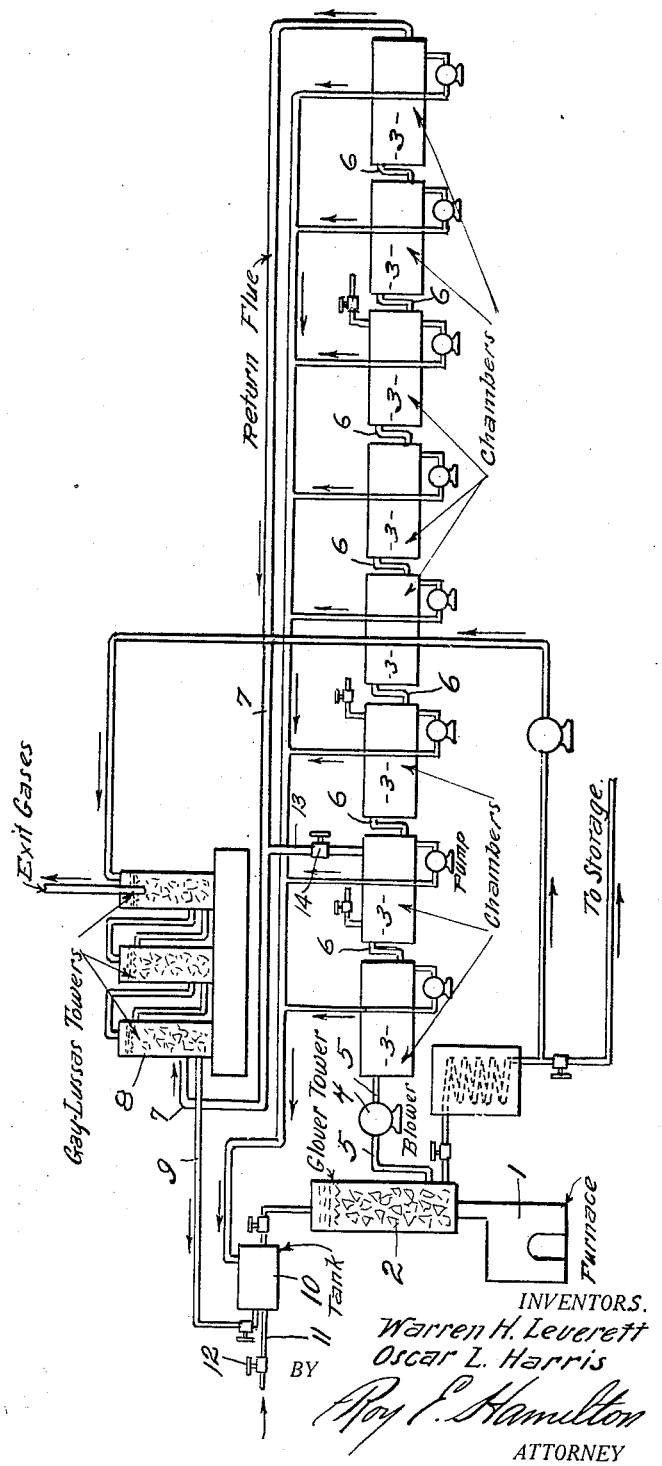
INVENTORS.
Warren H. Leverett
Oscar L. Harris
BY Roy E. Hamilton
ATTORNEY Patented Nov. 17, 1931

1,832,490

UNITED STATES PATENT OFFICE

WARREN H. LEVERETT AND OSCAR L. HARRIS, OF KANSAS CITY, KANSAS

PROCESS OF PRODUCING SULPHURIC ACID

Application filed July 22, 1927. Serial No. 207,672.

We have invented certain improvements in the chamber process of producing sulphuric acid which renders it more expeditious and considerably cheaper.

The specific object of this invention is to produce sulphuric acid in an economical manner by so conducting the process of sulphuric acid manufacture, especially what is known as the "chamber process", that the exit gases from the chambers will contain the proper percentage of sulphuric dioxide to insure high absorption in the Gay-Lussac tower or towers, of the niter gases contained in said exit gases.

Another object of this invention is a great saving of nitric acid which is directly due to the reaction produced by introducing chamber gases in the flue connecting the last chamber and the first Gay-Lussac tower which converts the nitrogen compounds in the gases to a form in which they are easily soluble in sulphuric acid under the conditions found in the Gay-Lussac tower, thus returning a large percent of the acid to the system and preventing their escape.

A still further object is the contemplation of a process of manufacturing sulphuric acid in which it is unnecessary to hold the sulphur dioxide content of the burner or roaster gas within narrow limits, and also that the chambers will operate satisfactorily and at a low consumption of niter at a very much lower sulphur dioxide content than under the present manufacturing conditions.

Greater stability than now obtained in those processes now in use is another object of this invention, since minor changes in conditions, such as draughts, sulphur dioxide content of gas, temporary deficiency of niter, etc., have small effect, the system re-establishing its equilibrium immediately after the disturbing cause is removed.

It is well known in the manufacture of sulphuric acid by this process that the presence of proper quantities of oxides of nitrogen in the sulphuric acid chambers to oxidize the vapor of burned sulphur or sulphur dioxide to the anhydride of sulphuric acid or sulphur trioxide, is required. Nitric acid is injected into the system to produce these oxides of nitrogen and to lessen the quantity of nitric acid used, it is desirous to use the same over and over again. In the present processes there is a great loss of the oxides of nitrogen by escaping, as gases from the Gay-Lussac tower, due to the fact that a part of the oxides of nitrogen are practically insoluble in sulphuric acid and it is these oxides of nitrogen that must be changed to a more soluble form in order that they may be dissolved and retained in the system.

In the production of sulphuric acid by the chamber process, it is known that the presence of a proper amount of sulphur dioxide in the exit gases from the last chamber greatly increases the absorption of the niter gases in the Gay-Lussac towers, by changing insoluble oxides of nitrogen to soluble oxides of nitrogen, but due to the varying conditions in the chamber system now in use it is impossible to maintain such proper amount of sulphur dioxide. In this invention the chambers are so regulated that only a small percent of sulphur dioxide passes with the exit gases from the last chamber which is insufficient to produce the proper absorption of the niter gases in the Gay-Lussac tower.

By long and careful experiments it has been found that in an intermediate chamber the gases contain a proper amount of sulphur dioxide to give the best results when mixed with the gases passing from the last chamber to the Gay-Lussac towers. A suitable apparatus to carry this process into effect is illustrated, diagrammatically, in the accompanying drawing, in which numeral 1 designates a furnace in which sulphur or some sulphide is burned. The resulting sulphur dioxide, air, etc., pass into the Glover tower 2, then it is forced by the blower 4 thru the pipe 5 and into the chambers 3, which are connected in series by pipes 6. Extending from the last chamber of the series is a return flue 7 which connects the same with the first of the series of Gay-Lussac towers 8, which are connected in the usual manner, and have the ordinary draw-off line 9 for the acid, which connects with the tank 10. A supply line 11, having control valve 12 is connected to tank 10 by means of which the necessary supply of nitric acid may be supplied to the system. Steam is also admitted to the system in the usual way and the necessary circulatory and draw-off lines for the acid are also provided.

For the purpose of providing a passage way for the gases between an intermediate chamber 3 and the return flue 7, we have provided a tube 13, having a control valve 14. If desired, more than one of the intermediate chambers may be connected to the return flue 7.

What we claim is:

1. The improvement, in the chamber process of producing sulphuric acid wherein a plurality of chambers is used, consisting in introducing chamber-gas from one of the chambers other than the last one, into the exit gases passing from the last chamber to the Gay-Lussac tower.

2. The improvement, in the chamber process of producing sulphuric acid wherein three or more sulphuric acid chambers are used, consisting in introducing chamber-gas from one of the intermediate chambers into exit gases passing from the last chamber to the Gay-Lussac tower or towers.

3. The improvement, in the chamber process of producing sulphuric acid, consisting in introducing chamber-gases, containing sulphur dioxide in sufficient quantity to insure the best recovery of niter in the Gay-Lussac tower, from one of the intermediate chambers into the exit gases passing from the last chamber to the Gay-Lussac tower.

4. The combination with the apparatus used in the chambers process for the manufacture of sulphuric acid having an intermediate chamber, and a return flue connecting the last chamber to the Gay-Lussac towers, of a single way tube connecting said intermediate chamber and return flue.

5. The combination with the apparatus used in the chambers process for the manufacture of sulphuric acid having an intermediate chamber, and a return flue connecting the last chamber to the Gay-Lussac towers, of a single way tube connecting said intermediate chamber and return flue and a control valve in said tube.

In testimony whereof, we hereunto affix our signatures.

WARREN H. LEVERETT.
OSCAR L. HARRIS.